United States Patent
Yamamoto

[11] Patent Number: 5,864,726
[45] Date of Patent: Jan. 26, 1999

[54] DEVICE FOR CONTROLLING OPERATION OF ELECTRO-DEVELOPING TYPE CAMERA

[75] Inventor: Yasuhiro Yamamoto, Tokyo, Japan

[73] Assignee: Asahi Kogaku Kogyo Kabushiki Kaisha, Tokyo, Japan

[21] Appl. No.: 749,021

[22] Filed: Nov. 14, 1996

[30] Foreign Application Priority Data

Nov. 15, 1995 [JP] Japan ................................ 7-321117

[51] Int. Cl.⁶ .................................................. G03B 19/00
[52] U.S. Cl. .................................... 396/429; 396/303
[58] Field of Search ............................... 396/277, 278, 396/279, 301, 302, 303, 30, 429; 358/909.1; 348/372, 64, 209, 220, 231, 233, 328

[56] References Cited

U.S. PATENT DOCUMENTS

| | | | |
|---|---|---|---|
| 4,982,220 | 1/1991 | Akasaka | 354/468 |
| 5,095,226 | 3/1992 | Tani . | |
| 5,111,299 | 5/1992 | Aoki et al. . | |
| 5,412,425 | 5/1995 | Nagano | 348/372 |
| 5,424,156 | 6/1995 | Aoki et al. . | |
| 5,424,772 | 6/1995 | Aoki et al. . | |
| 5,500,710 | 3/1996 | Saito et al. | 354/484 |
| 5,638,103 | 6/1997 | Obata et al. | 347/164 |

FOREIGN PATENT DOCUMENTS 5-2280  1/1993  Japan .

*Primary Examiner*—Safet Metjahic
*Assistant Examiner*—John Chizmar
*Attorney, Agent, or Firm*—Greenblum & Bernstein, P.L.C.

[57] ABSTRACT

An operation control device is provided in an electro-developing type camera using a recording medium which electronically develops an image formed by a photographing optical system. An electric charge in a battery is sensed. When the electric charge remaining in the battery is lower than a second threshold value, which is lower than a first threshold value, the recording operation is prohibited. When the electric charge remaining in the battery is lower than the first threshold value and higher than the second threshold value, the recording operation is permitted and the reading operation is prohibited. Accordingly, during the reading operation, the electric charge remaining in the battery cannot become lower than the first threshold value, and thus the reading operation can be carried out.

7 Claims, 5 Drawing Sheets

DEVICE FOR CONTROLLING OPERATION OF ELECTRO-DEVELOPING TYPE CAMERA

BACKGROUND OF THE INVENTION

1. Field of the Invention

The present invention relates to a camera using a recording medium in which an object image obtained through a photographing optical system is electronically developed, and more particularly, to a device controlling a reading operation in which the image recorded in the recording medium is read out therefrom.

2. Description of the Related Art

Conventionally, as disclosed in Japanese Unexamined Patent Publication No. 5-2280 and U.S. Pat. No. 5,424,156, there is a known; photographic material which is electronically developed directly so that the developed visible image can be immediately obtained. In this specification, such a recording medium is referred to as an electro-developing recording material, and an electronic still camera using the electro-developing recording material is referred to as an electro-developing type camera.

Reading an image recorded in the electro-developing recording medium using an optical sensor (such as a line sensor) not only takes a relatively long time, but also consumes a greater amount of electric power in comparison with a recording operation. Accordingly, during the reading operation electric charge in the battery may become too low to continue the reading operation.

SUMMARY OF THE INVENTION

Therefore, an object of the present invention is to provide an operation control device by which it is ensured that a reading operation is always possible while an image recorded in the electro-developing recording medium is being read.

According to the present invention, there is provided a device for controlling an operation of an electro-developing type camera using a electro-developing recording medium by which an image is electronically developed. The control device includes an image recording processor, an image reading processor, a battery, a sensing processor, and a control processor.

The image recording processor records an image in the electro-developing recording medium. The image reading processor reads the image recorded in the electro-developing recording medium. The battery supplies an electric power to operate each of the image recording processor and the image reading processor. The sensing processor senses a remaining electric charge held by the battery. The control processor prohibits an operation of the image reading processor and permits an operation of the image recording processor when the electric charge remaining in the battery is lower than a first threshold value.

Further, according to the present invention, there is provided a device for controlling an operation of an electro-developing type camera using a electro-developing recording medium by which an image is electronically developed, the control device comprising an image recording processor, an image reading processor, and a battery.

The image recording processor records an image in the electro-developing recording medium. The image reading processor reads the image recorded in the electro-developing recording medium. The battery supplies an electric power to operate each of the image recording processor and the image reading processor. The operation of the image reading processor and the operation of the image recording processor are prohibited when the electric charge remaining in the battery is lower than a predetermined value.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
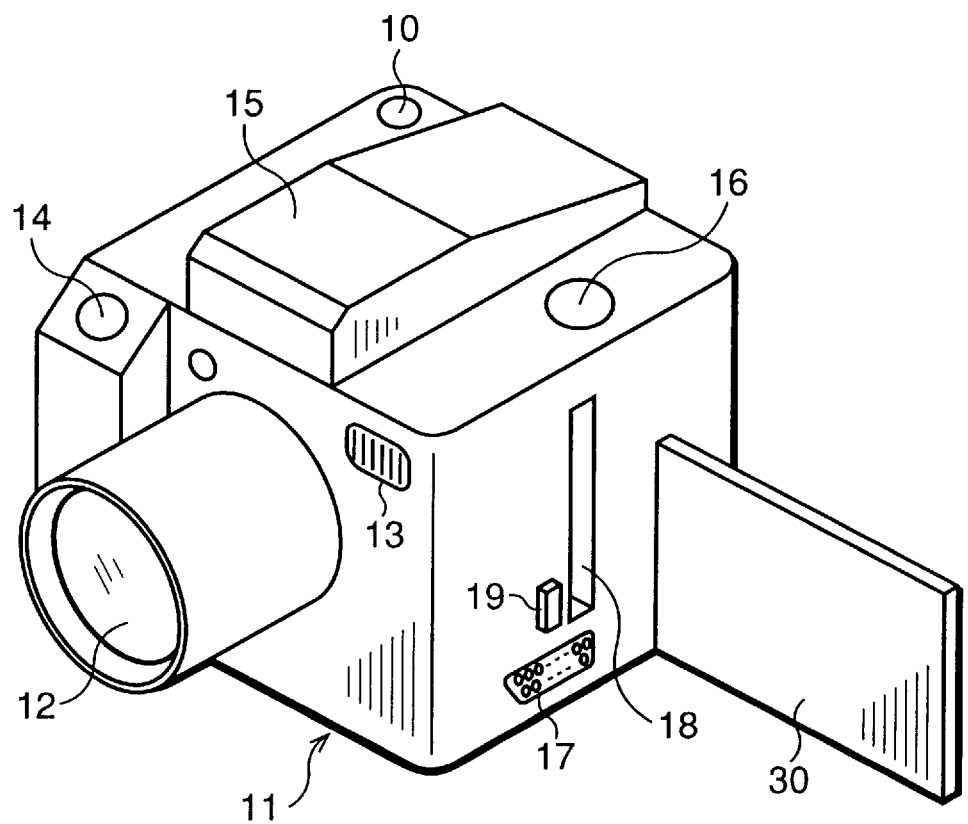
FIG. 1 is an external view showing an electro-developing type camera to which an embodiment according to the present invention is applied.

FIG. 1 is an external view of an electro-developing type camera to which an embodiment according to the present invention is applied.

When viewing a camera body 11 from a front side, a photographing optical system 12 (including a photographing lens system) is provided approximately at a center portion of the front surface of the camera body 11. An electronic flash 13 is disposed thereon to the right of and above the photographing optical system 12. A release switch 14 is provided on the side opposite to the electronic flash 13.

On the upper surface of the camera body 11, a view finder 15 is provided at a center portion thereof, and extends from the front end to the rear end of the camera body 11. A main switch 10, by which an electric power can be turned ON and an operation mode of the camera can be set, is provided on the upper surface to the right of the view finder 15. A scanning switch 16 is provided on the side opposite to the main switch 10.

An output terminal 17 is formed on a lower portion of a side surface of the camera body 11, so that an image signal obtained by this camera can be output to an external recording device. Further, a slot 18, into which the electro-developing recording medium 30 is mounted in the camera body 11, is formed on the side surface of the camera body 11. An eject switch 19, which is pressed to remove the electro-developing recording medium 30 from the camera body 11, is provided close to the slot 18.

Figure 2:
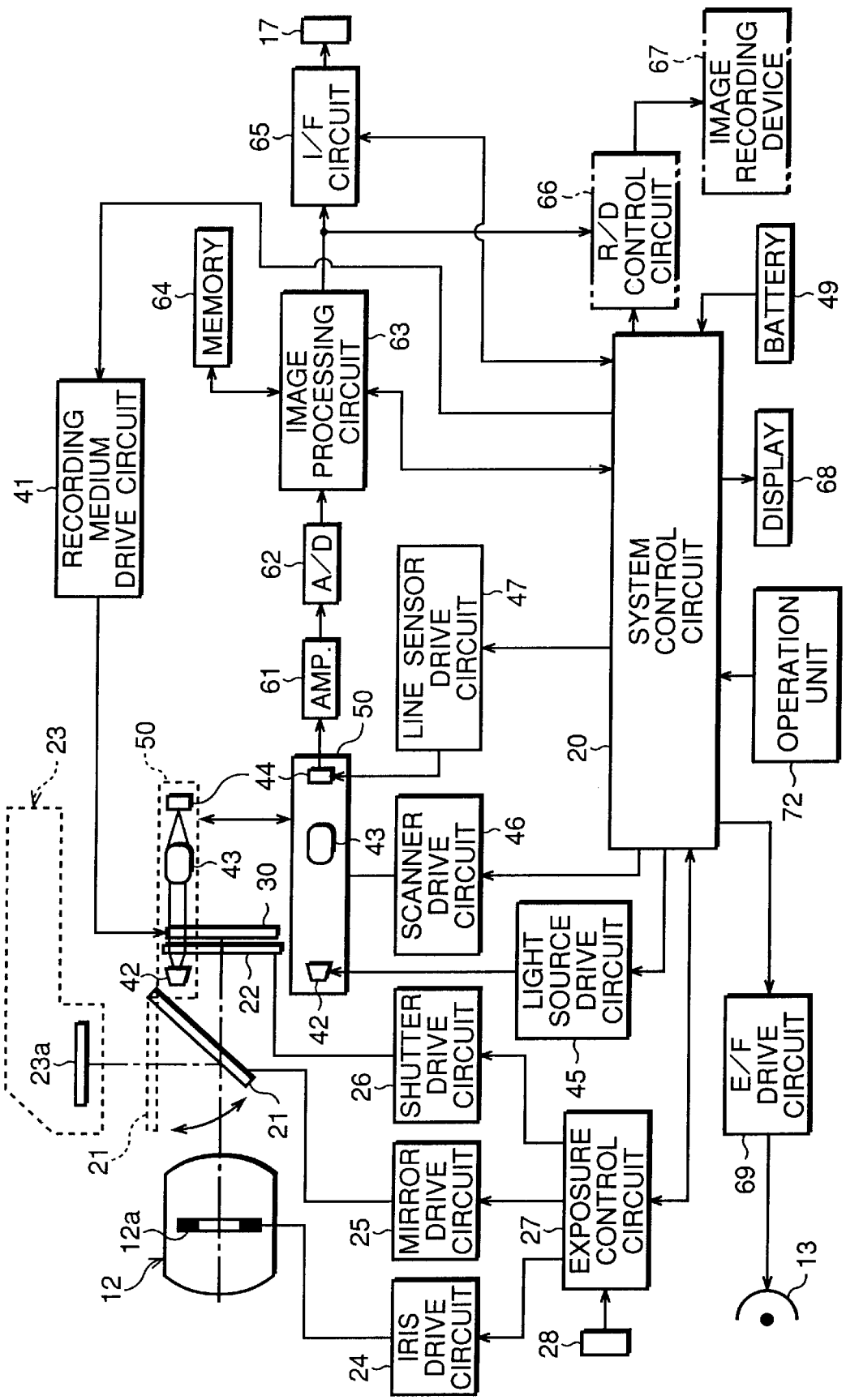
FIG. 2 is a block diagram of the electro-developing type camera.

FIG. 2 is a block diagram of the electro-developing type camera, in which a system control circuit 20, including a microcomputer, is mounted to control the electro-developing type camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal output by the system control circuit 20. Namely, the size of the opening of the aperture 12a is adjusted by the iris drive circuit 24 under the control of the exposure control circuit 27 based on a signal output by a photometry sensor 28.

The quick return mirror 21 is usually set to a down position (an inclining position shown by the solid line in the drawing), so that a light beam passing through the photographing optical system 12 is led to the view-finder optical system 23. An object to be photographed can thus be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed. During a photographing operation, the shutter 22 is opened for a predetermined period by the shutter drive circuit 26 under the control of the exposure control circuit 27. The light beam passing through the photographing optical system 12 enters a light receiving surface of the electro-developing recording medium 30 to form a two-dimensional image thereon.

An electric voltage (recording medium activating signal) is applied to the electro-developing recording medium 30 under the control of a recording medium drive circuit 41. By exposing the electro-developing recording medium 30 while applying this voltage, an image formed by the photographing optical system 12 is developed on the electro-developing recording medium 30 as a visible image. Note that the recording medium drive circuit 41 is operated in accordance with a command signal output by the system control circuit 20.

A scanning mechanism 50 is provided close to the electro-developing recording medium 30. A light source 42 includes an LED (light emitting diode) and a collimator lens, and emits a parallel light beam. The light source 42, a scanner optical system 43 and a line sensor 44 are supported by the scanning mechanism 50, and are moved along the electro-developing recording material 30 by a scanning operation of the scanning mechanism 50.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The light source 42 can be moved along the front surface of the shutter 22 or the front surface of the electro-developing recording medium 30. The line sensor 44 can be moved along the rear surface of the electro-developing recording medium 30. The scanner optical system 43 is disposed between the light source 42 and the line sensor 44. When scanning is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44 through an operation of the scanner optical system 43. Namely, the scanner optical system 43 is disposed in the optical path of the light beam which passes through the electro-developing recording medium 30, and the line sensor 44 is moved in an imaging plane on which an image is formed by the scanner optical system 43.

An ON and OFF control of the light source 42 is performed by a light source drive circuit 45. Control of the reading operation of the pixel signal generated in the line sensor 44 is carried out by a line sensor drive circuit 47. The control of the movement of the scanning mechanism 50 is performed by a scanner drive circuit 46. The circuits 45, 46 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction etc. by an image processing circuit 63 under the control of the system control circuit 20, and then temporarily stored in a memory 64. The memory 64 includes an EEPROM in which correction data for the shading correction is stored. Note that the memory 64 may have a storage capacity equal to one horizontal scanning line outputted from the line sensor 44, or may have a storage capacity of image signals of one frame.

The pixel signals output from the memory 64 are input to an interface circuit 65 through the image processing circuit 63, so that the pixel signals are subjected to a predetermined process such as a format conversion, and can be output to an external computer (not shown) through the output terminal 17. The pixel signals output from the image process circuit 63 are subjected to a predetermined process, such as an image compression and a format conversion, in a recording device control circuit 66; the pixel signals are recorded on a recording medium such as an IC memory card, for example, in an image recording device 67. The image recording device 67 is controlled by the recording device control circuit 66. The interface circuit 65 and the recording device control circuit 66 are operated in accordance with a command signal output from the system control circuit 20.

A battery 49 is connected to the system control circuit 20 to supply an electric power to each of the electric circuits provided in the electro-developing type camera. The electric charge remaining in the battery 49 is sensed by the system control circuit 20. An operation unit 72 having the main switch 10, the release switch 14, and the scanning switch 16, is connected to the system control circuit 20. The main switch 10 also serves as a mode switch for setting each of operation modes of the electro-developing type camera. A display device 68 for indicating various setting conditions of the electro-developing type camera, and an electronic flash drive circuit 69 for performing a flash control of the electronic flash 13, are also connected to the system control circuit 20.

When the release switch 14 is fully depressed, a photographing operation is carried out, and thus an object image is recorded in the electro-developing recording medium 30. When the scanning switch 16 is depressed, the scanning mechanism 50 is driven so that the image recorded in the electro-developing recording medium 30 is read by the line sensor 44.

Figure 3:
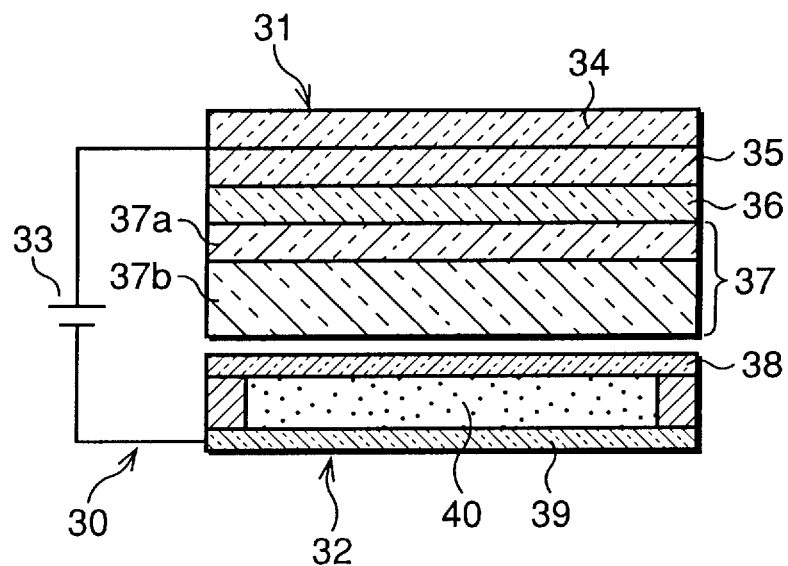
FIG. 3 is a sectional view showing a structure of an electro-developing recording medium.

FIG. 3 shows a structure of the electro-developing recording medium 30, which is basically the same as an electro-developing recording medium shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed during application of the electric voltage, an electric charge is generated in the electrostatic information recording medium 31 in accordance with an image formed thereon. Since the intensity of the electric field applied to the liquid crystal 40 is changed in accordance with the electric charge, the image is indicated on the liquid crystal display 40 as a visible image. Thus, an image of an object is developed. Namely, the visible image is generated in accordance with the electric charge.

The electric charge storage medium 32 is a liquid crystal display having a memory-type liquid crystal. Thus, the developed visible image is held or retained therein even if the electric field is removed. In the liquid crystal display, the developed visible image can be erased by heating the liquid crystal display, using a heating device (not shown) at a predetermined temperature. In this case, the same electric charge storage medium 32 can be used repeatedly.

Figure 4:
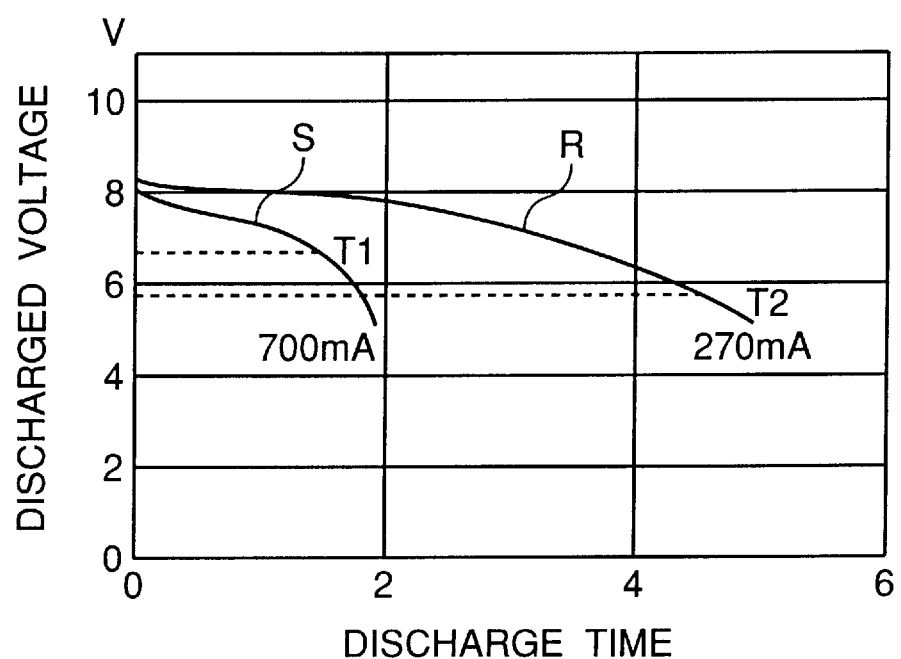
FIG. 4 is a diagram showing discharge characteristics of a battery.

FIG. 4 shows a discharge characteristics of the battery 49. As understood from this drawing, the electric charge remaining in the battery 49 decreases in accordance with the discharge time thereof. The current consumption is 700 mA (see a solid line S), for example, in the reading operation in which the image recorded in the electronic developing recording medium 30 is read, and is 270 mA (see a solid line R), for example, in the recording operation in which an image is recorded in the electro-developing recording medium 30. Therefore, in the reading operation, the output voltage of the battery 49 decreases faster than in the recording operation.

Furthermore, a first threshold value T1, i.e.,. a first minimum electric charge required for the reading operation, is higher than a second threshold value T2, i.e., a second minimum electric charge required for the recording operation. The time required for the reading operation is approximately 1 minute, for example, which is longer than needed for the recording operation. Accordingly, when the electric charge remaining in the battery 49 is relatively low, the reading operation may not be completed.

Figure 5:
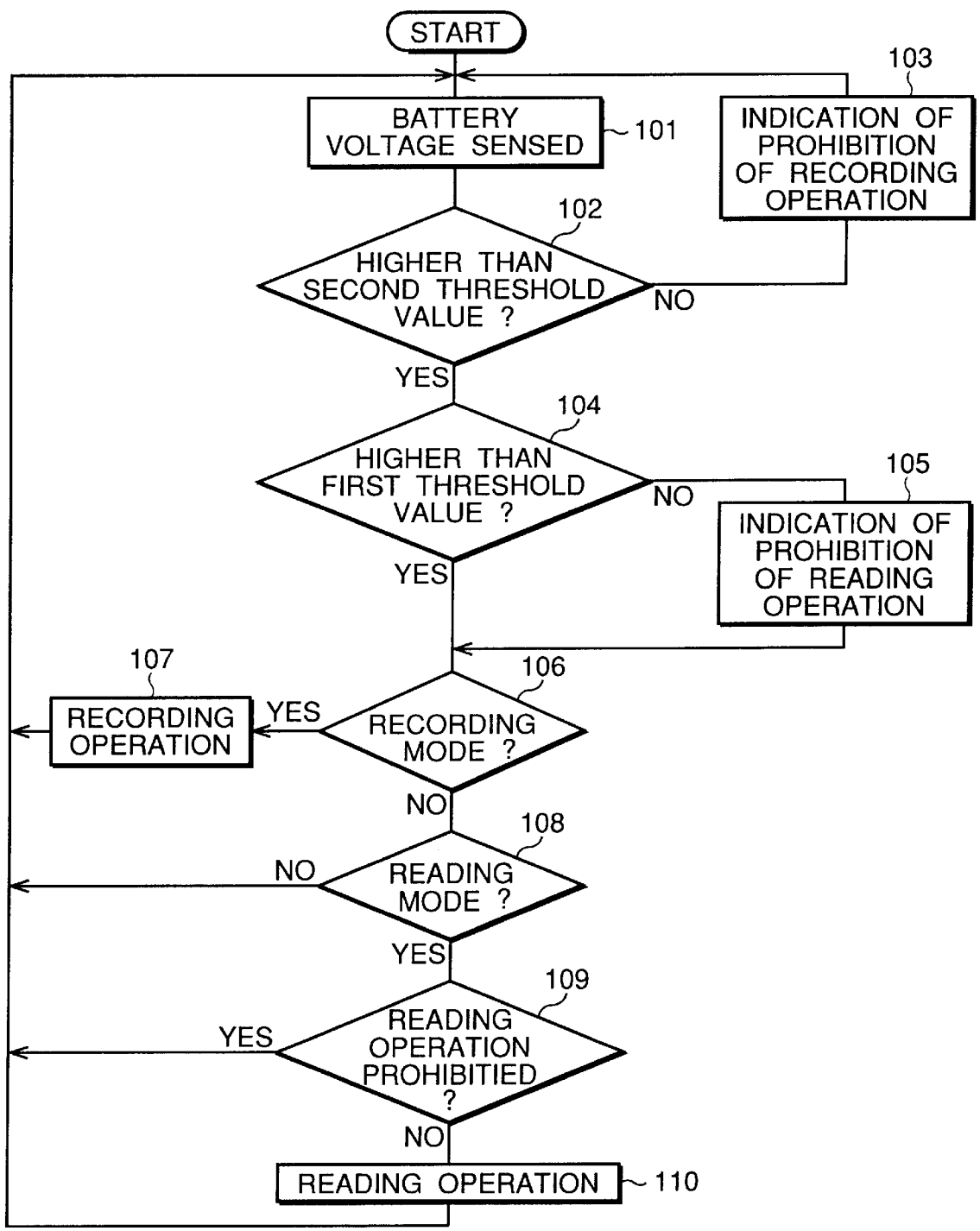
FIG. 5 is a flow chart of a main program for performing a reading operation and a recording operation.

Therefore, in this embodiment, the reading operation or the recording operation is prohibited in accordance with the electric charge remaining in the battery 49. FIG. 5 is a flow chart of a main program for performing the reading operation and the recording operation.

In Step 101, the amount of charge held in a battery 49 is sensed. In Step 102, it is determined whether or not the electric charge remaining in the battery 49 is higher than the second minimum electric charge (the second threshold value T2) required for the recording operation. When the electric charge remaining in the battery 49 is lower than the second threshold value T2, Step 103 is executed to prohibit the recording operation; an indication that the recording operation is prohibited is shown by the display device 68. This program then returns to Step 101. The main program does not proceed to Step 104 until the battery 49 is replaced with a new battery having an electric charge remaining that is sufficient to carry out each of the operations.

When it is determined in Step 102 that the electric charge remaining in the battery 49 is higher than the second threshold value T2, it is determined in Step 104 whether or not the electric charge remaining in the battery 49 is higher than the first minimum electric charge (i.e., the first threshold value T1) required for the reading operation. When the electric charge remaining in the battery 49 is lower than the first threshold value T1, Step 105 is executed to prohibit the reading operation, and an indication that the reading operation is prohibited is shown by the display device 68.

Regardless of whether or not the electric charge remaining in the battery 49 is higher than the first threshold value T1, Step 106 is executed, in which it is determined whether or not the mode switch or main switch 10 has been set to the recording mode. When the recording mode is set, a subroutine for performing the recording operation is executed in Step 107, and the main program returns to Step 101. Even if the electric charge remaining in the battery 49 is lower than the first threshold value T1, when the recording operation is not prohibited because the electric charge remaining in the battery 49 is higher than the second threshold value T2 (i.e., when Step 103 is not executed), the recording operation can be performed.

When it is determined in Step 106 that the mode switch is not set to the recording mode, it is determined in Step 108 whether or not the mode switch is set to the reading mode. When the reading mode is not set, the main program returns to Step 101. Conversely, when the reading mode is set, it is determined in Step 109 whether or not the reading mode is prohibited. When the reading operation is prohibited, the main program returns to Step 101. When the reading operation is not prohibited, after the subroutine for the reading operation is executed in Step 110, the program returns to Step 101.

Figure 6:
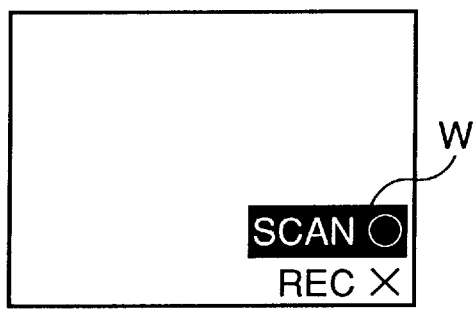
FIG. 6 is a view showing an example of indication when the reading operation and the recording operation can be performed.
Figure 7:
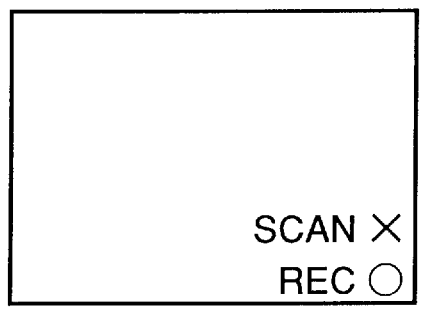
FIG. 7 is a view showing an example of indication when the reading operation can be performed and the recording operation cannot be performed.
Figure 8:
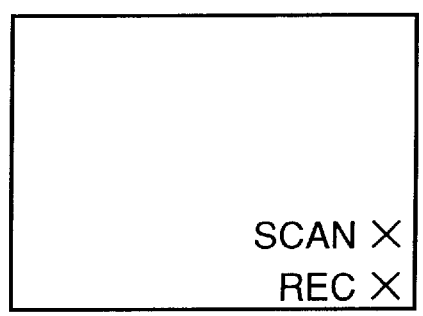
FIG. 8 is a view showing an example of indication when the reading operation and the recording operation are prohibited.

FIGS. 6, 7, and 8 show examples of indications of each of the prohibiting conditions, as shown by the display device 68. FIG. 6 shows a state in which the reading operation (SCAN) and the recording operation (REC) can be performed, and in which the electric charge remaining in the battery 49 is higher than the first threshold value T1. In this state, the indications representing the mode selected in Step 106 or Step 108 are shown in a reverse form (reference W), for example. FIG. 7 shows a state in which the reading operation can be performed and the recording operation cannot be performed, i.e., a state in which the electric charge remaining in the battery 49 is between the first threshold value T1 and the second threshold value T2. FIG. 8 shows a state in which the reading operation and the recording operation are prohibited, i.e., a state in which the electric charge remaining in the battery 49 is lower than the second threshold value T2.

As described above, this embodiment is constructed in such a manner that, when an ongoing reading operation cannot be ensured (because the electric charge remaining voltage of the battery 49 is too low) the recording operation is permitted to be carried out while the reading operation is prohibited. Therefore, the reading operation is not stopped during the operation thereof, and the reading of image data corresponding to one frame can be always completed. Further, since the recording operation can be performed in spite of a relatively low electric charge in the battery 49, the use-efficiency of the battery 49 is improved.

Note that, in each of Steps 102 and 104, the value of the electric charge remaining in the battery 49 can be compared with a value which is higher than the first or second threshold value by a predetermined value, respectively.

Further, note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-321117, (filed on Nov. 15, 1995) which is expressly incorporated herein, by reference, in its entirety.

I claim:

1. A device for controlling an operation of an electro-developing type camera using a electro-developing recording medium by which an image is electronically developed, said control device comprising:

an image recording processor recording an image in said electro-developing recording medium;

an image reading processor reading said image from said electro-developing recording medium;

a battery supplying an electric power to operate each of said image recording processor and said image reading processor;

a sensing processor sensing an electric charge remaining in said battery; and a control processor prohibiting an operation of said image reading processor and permitting an operation of said image recording processor when the electric charge remaining in said battery is lower than a first threshold value.

2. A control device according to claim 1, further comprising a condition indicator indicating a condition of said electro-developing type camera, said condition indicator indicating that the operation of said image reading processor is prohibited when the electric charge remaining in said battery is lower than said first threshold value.

3. A control device according to claim 1, wherein said control processor prohibits the operation of said image recording processor when the electric charge remaining in said battery is lower than a second threshold value, which is lower than said first threshold value.

4. A control device according to claim 3, further comprising a condition indicator indicating a condition of said electro-developing type camera, said condition indicator indicating that the operations of said image reading processor and said image recording processor are prohibited when the electric charge remaining in said battery is lower than said second threshold value.

5. A control device according to claim 1, wherein said electro-developing recording medium comprises an electrostatic information recording medium generating an electric charge in accordance with an image formed thereon, and an electric charge storage medium which generates a visible image in accordance with said electric charge and which can retain said visible image.

6. A control device according to claim 5, wherein said electric charge storage medium is a liquid crystal display having a memory-type liquid crystal.

7. A device for controlling an operation of an electro-developing type camera using a electro-developing recording medium by which an image is electronically developed, said control device comprising:

means for recording an image in said electro-developing recording medium;

means for reading said image from said electro-developing recording medium;

a battery supplying an electric power to operate each of said image recording processor and said image reading processor;

means for sensing an electric charge remaining in said battery; and means for controlling operations of said image reading means and said image recording means, said control means prohibiting the operation of said image reading means and permitting the operation of said image recording processor when the electric charge remaining in said battery is lower than a first threshold value.

* * * * *